United States Patent
Royal, Sr. et al.

(10) Patent No.: US 6,845,999 B2
(45) Date of Patent: Jan. 25, 2005

(54) MOTORCYCLE AUTOMATIC BALANCING STAND AND METHODS

(76) Inventors: Chris Royal, Sr., P.O. Box 917, Grantsville, UT (US) 84029; Chris Royal, Jr., P.O. Box 917, Grantsville, UT (US) 84029

(*) Notice: Subject to any disclaimer, the term of this patent is extended or adjusted under 35 U.S.C. 154(b) by 0 days.

(21) Appl. No.: 10/464,972

(22) Filed: Jun. 20, 2003

(65) Prior Publication Data

US 2004/0256835 A1 Dec. 23, 2004

(51) Int. Cl.[7] .................................................. B60S 9/02
(52) U.S. Cl. .................. 280/304; 280/766.1; 280/767
(58) Field of Search ................................ 280/293, 304, 280/763.1, 765.1, 766.1, 767

(56) References Cited

U.S. PATENT DOCUMENTS

| | | | | |
|---|---|---|---|---|
| 1,013,804 A | * | 1/1912 | Nitzsche | 280/160 |
| 2,352,464 A | * | 6/1944 | Leo | 280/160 |
| 3,980,150 A | * | 9/1976 | Gigli | 180/209 |
| 4,691,798 A | * | 9/1987 | Engelbach | 180/209 |
| 5,029,894 A | * | 7/1991 | Willman | 280/755 |
| 5,401,055 A | * | 3/1995 | Pham | 280/755 |

FOREIGN PATENT DOCUMENTS

| | | | | |
|---|---|---|---|---|
| GB | 2104464 A | * | 3/1983 | B62H/1/12 |
| WO | WO 03013945 A1 | * | 2/2003 | |

* cited by examiner

*Primary Examiner*—Kevin Hurley
(74) *Attorney, Agent, or Firm*—Harry M. Weiss; Weiss, Moy & Harris, P.C.

(57) ABSTRACT

An automatic balancing stand and a method for supporting a motorcycle in an upright position are disclosed. The stand comprises a motion sensor coupled to a controller housed in an housing that signals a pump when the motorcycle changes speed. The housing is coupled to a hydraulic pump assembly comprising at least a pump, valve mechanism and hydraulic fluid. The stand further comprises a pair of members which are each coupled to a slidable member coupled to a wheel. Another end of the pair of members is coupled to the hydraulic pump assembly. The motion sensor signals the controller, activating the pump when the motorcycle slows to a preset speed, causing the pump to activate hydraulic pistons within each one of the members, extending the slidable members fully when the motorcycle is stationary. The slidable members are retracted when the motorcycle moves above the preset speed.

9 Claims, 2 Drawing Sheets

MOTORCYCLE AUTOMATIC BALANCING STAND AND METHODS

FIELD OF THE INVENTION

This invention relates generally to stands for motorcycles, and more specifically to, automatic balancing stands for supporting stationary motorcycles in an upright position and methods for providing support for a stationary motorcycle in an upright position.

BACKGROUND OF THE INVENTION

In the past, there have been a number of devices for supporting a motorcycle in an upright position when it was desired to keep the motorcycle stationary, such as during parking of the motorcycle. The simplest of these devices for motorcycles required physical contact with a kick stand pivotally connected to the motorcycle frame. When a motorcycle was stopped, the stand was kicked to an operative extended position to support the motorcycle on the ground. The stand was lifted into the non-extended position to allow the motorcycle to proceed. Riders either needed to support the motorcycle with their feet or get off the motorcycle to release the kick stand.

Currently, a number of more complex stands have been proposed that require mechanical interactions between components such as gears that may result in unreliability due to mechanical breakdown. Many of the stands that have been proposed are similar to kick stands since they use friction on a flat edged component that touches the ground when the motorcycle approaches a stationary position. This leads to premature wearing out of such a component and may lead to sparking that is dangerous near fuel driven motorcycles.

Su, U.S. Pat. No. 5,886,349 proposed an automated motorcycle stand that is activated by a manual switch. The stand comprises two specially designed rods vertically mounted to the bottom of a motorcycle. The rods are activated from a retracted position to an extended position by means of complex gearing that is coupled to in-built electronics. The rods have wheels that touch the ground in the extended position. As discussed above, the need for mechanical gears may lead to mechanical unreliability. The need for a manual switch to activate the stand is a limitation on the automatic nature of the stand.

For the foregoing reasons, there is a need to provide improved automatic balancing stands for supporting motorcycles in an upright position and methods for providing support for a stationary motorcycle in an upright position.

SUMMARY OF THE INVENTION

Accordingly, it is an object of this invention to provide improved automatic balancing stands to support stationary motorcycles in an upright position.

It is a further object of this invention to provide improved automatic balancing stands to support stationary motorcycles in an upright position that require minimal mechanical components.

It is a still further object of this invention to provide improved automatic balancing stands to support stationary motorcycles in an upright position that are activated by sensors rather than mechanical switches.

It is a still further object of this invention to provide improved automatic balancing stands to support stationary motorcycles in an upright position that use hydraulics.

It is a still further object of this invention to provide a method for supporting a stationary motorcycle in an upright position.

PREFERRED EMBODIMENTS OF THE INVENTION

In accordance with one embodiment of this invention, an automatic balancing stand for a motorcycle is disclosed. The automatic balancing stand comprises in combination a balancing stand coupled to the motorcycle; hydraulic means coupled to the motorcycle and to the balancing stand for selectively hydraulically raising and lowering the balancing stand; and means for detecting speed changes of the motorcycle and for selectively controlling the hydraulic means to hydraulically lower the balancing stand when the motorcycle is below a preset speed and to hydraulically raise the balancing stand when the motorcycle is above a preset speed.

In accordance with a second embodiment of this invention, an automatic balancing stand for a motorcycle is disclosed. The automatic balancing stand comprises, in combination a motion sensor for detecting speed changes of the motorcycle; a controller coupled to the motion detector; a hydraulic pump assembly, the hydraulic pump assembly coupled to the controller; a pair of members, an end of each one of the members coupled to the hydraulic pump assembly; and a pair of slidable members, an end of each one of the slidable members coupled to another end of each one of the members, so that when the motion detector sensing the motorcycle reaches a preset speed, the motion detector signaling the controller, activating the hydraulic pump assembly, fully extending each one of the slidable members when the motorcycle is stationary, and deactivating the hydraulic pump assembly when the preset speed is exceeded, fully retracting the slidable members. The automatic balancing stand further comprises a pair of joint couplers, an end of each one of the joint couplers coupled to another end of each of the slidable members, and a pair of wheels, each one of the wheels coupled to another end of each one of the joint couplers. The automatic balancing stand further comprises a pair of wheel covers, each one of the wheel covers coupled to a portion of an outer surface of each one of the joint couplers for protecting the wheels. The hydraulic pump assembly further comprises at least a hydraulic pump, a valve mechanism and hydraulic fluid for driving a pair of one-sided hydraulic pistons. The automatic balancing stand further comprises an ignition switch of the motorcycle coupled to the controller, the controller closing the valve mechanism when the ignition switch is turned off, the slidable members remaining fully extended, and the controller opening the valve mechanism when the ignition switch is turned on, retracting the slidable members when the motorcycle exceeds a preset speed. The automatic balancing stand further comprises a hydraulic pump and a housing, the controller and a portion of the hydraulic pump are enclosed in the housing for driving a hydraulic pump, the housing coupled to the hydraulic pump assembly. Each one of the members is a hydraulic cylinder, each one of the members including a one-sided hydraulic piston that drives each one of the slidable members from a retracted position to an extended position. The automatic balancing stand is coupled to at least a portion of a surface of the motorcycle. The motion sensor is coupled to a wheel of the motorcycle. Alternatively, the motion sensor is coupled to a speed indicator gauge of the motorcycle. The motion sensor is selected from the group consisting of a photocell, a RF sensor and a gyroscope. The pair of members coupled to the hydraulic pump assembly are substantially V-shaped so that the automatic balancing stand straddles a lower portion of the motorcycle.

In accordance with a third embodiment of this invention, a method for automatically balancing a motorcycle in an upright position is disclosed. The method comprises the steps of providing a balancing stand coupled to the motorcycle; providing hydraulic means coupled to the motorcycle and to the balancing stand for selectively hydraulically raising and lowering the balancing stand; and providing means for detecting speed changes of the motorcycle and for selectively controlling the hydraulic means to hydraulically lower the balancing stand when the motorcycle is below a preset speed and to hydraulically raise the balancing stand when the motorcycle is above a preset speed.

In accordance with a fourth embodiment of this invention, a method for automatically balancing a motorcycle in an upright position is disclosed. The method comprises the steps of providing a motion sensor for detecting speed changes of the motorcycle; providing a controller coupled to the motion detector; providing a hydraulic pump assembly, the hydraulic pump assembly coupled to the controller; providing a pair of members, an end of each one of the members coupled to the hydraulic pump assembly; providing a pair of slidable members, an end of each one of the slidable members coupled to another end of each one of the members; sensing the motorcycle speed using the motion sensor; signaling the controller using the motion sensor; activating the hydraulic pump assembly using the controller when the motorcycle reaches a preset speed; fully extending each one of the slidable members when the motorcycle is stationary; and fully retracting the slidable members by deactivating the hydraulic pump assembly when the preset speed is exceeded. The method further comprises providing a pair of joint couplers, an end of each one of the joint couplers coupled to another end of each of the slidable members; providing a pair of wheels, each one of the wheels coupled to another end of each one of the joint couplers, and providing a pair of wheel covers, each one of the wheel covers coupled to a portion of an outer surface of each one of the joint couplers for protecting the wheels. The method further comprises providing the hydraulic pump assembly comprising at least a hydraulic pump, a valve mechanism and hydraulic fluid for driving a pair of one-sided hydraulic pistons; and providing a hydraulic pump and a housing, the controller and a portion of the hydraulic pump enclosed in the housing for driving the hydraulic pump, the housing coupled to the hydraulic pump assembly. The method further comprises providing an ignition switch of the motorcycle coupled to the controller; the controller closing the valve mechanism when the ignition switch is turned off, the slidable members remaining fully extended; and the controller opening the valve mechanism when the ignition switch is turned on, retracting the slidable members when the motorcycle exceeds a preset speed. The method further comprises providing each one of the members is a hydraulic cylinder; and providing each one of the members including a one-sided hydraulic piston that drives each one of the slidable members from a retracted position to an extended position.

The foregoing and other objects, features, and advantages of the invention will be apparent from the following, more detailed description of the preferred embodiments of the invention, as illustrated in the accompanying drawings.

DESCRIPTION OF THE INVENTION

Figure 1:
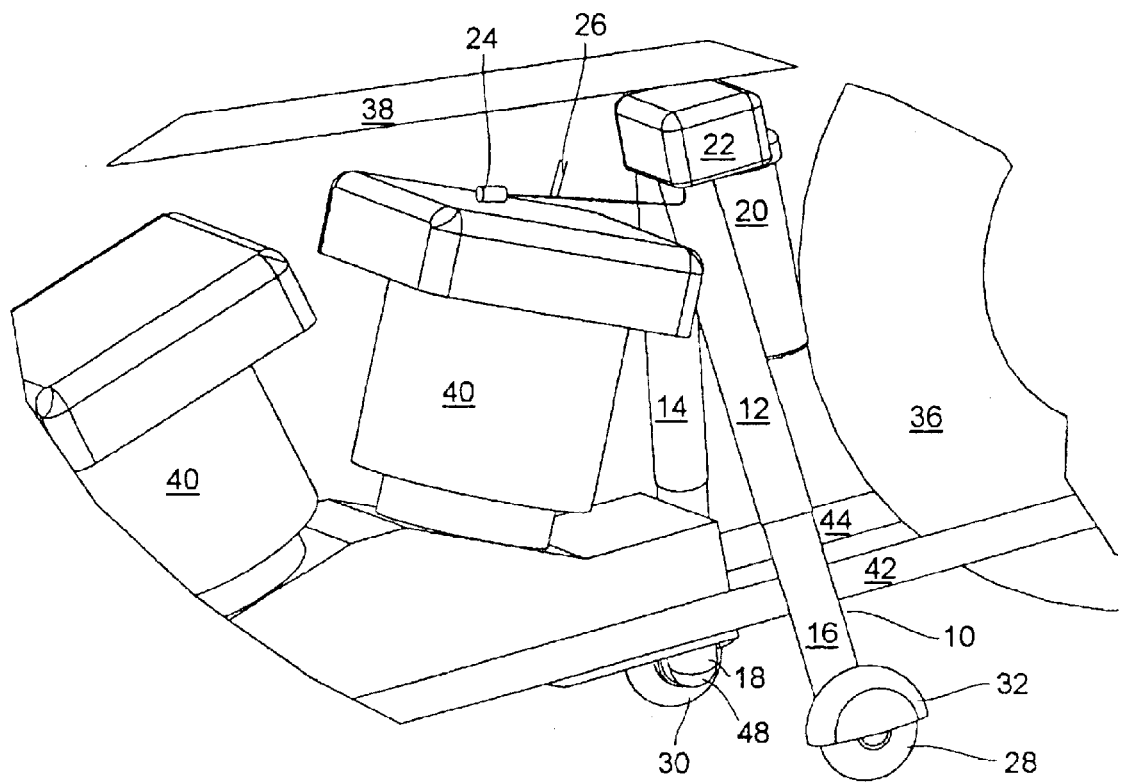
FIG. 1 is a perspective view of a portion of a motorcycle with an automatic balancing stand in an extended position mounted to a frame near a rear wheel of the motorcycle in accordance with this invention.

According to FIG. 1, an automatic balancing stand 10 is secured to a portion of a surface of a top frame member 38 and to a portion of a surface of a piston 40 of a motorcycle near a rear wheel 36 of the motorcycle and a pair of slidable members 16, 18 of the automatic balancing stand 10 is in an extended position. The automatic balancing stand 10 comprises a pair of members 12, 14, which are substantially V-shaped. One end of each one of the pair of members 12, 14 is coupled to an end of each one of the pair of slidable members 16, 18. When the slidable member 16, 18 are in an extended position (see FIGS. 1 and 3) the slidable members 16, 18 straddle outside of two lower frame members 42, 44 of the motorcycle. Each one of the slidable members 16, 18 is coupled to an end of one of a pair of joint couplers 46, 48 (see FIGS. 1 and 3) at an opposite end of each one of the slidable members 16, 18. Another end of each one of the joint couplers 46, 48 is coupled to each one of a pair of wheels 28, 30 allowing the automatic balancing stand 10 to smoothly roll on the ground when the slidable members 16, 18 are in an extended position (see FIGS. 1 and 3). A pair of wheel covers 32, 34 (see FIGS. 1 and 2) are coupled to a portion of an external surface of each one of the pair of joint couplers 46, 48 (see FIGS. 1 and 3). The wheel covers 32, 34 are safety protectors from the wheels 28, 30 for a user of the motorcycle and safety protectors for the wheels 28, 30 from flying debris.

Referring further to FIGS. 1–4, each one of the pair of members 12, 14 is a hydraulic cylinder comprising a one-sided hydraulic piston housed internally within each one of the pair of members 12, 14. Another end of each one of the pair of members 12, 14 is coupled to a hydraulic pump assembly 20. The hydraulic pump assembly 20 comprises at least a pump, a valve mechanism and hydraulic fluid to provide hydraulic action for each one of the one-sided hydraulic pistons so that each one of the pair of slidable members 16, 18 may be extended when the pump is activated. The hydraulic pump assembly 20 is further coupled to the pump that is partially enclosed in a housing 22, as well as in the hydraulic pump assembly 20. A motion sensor 24, which is coupled to a power supply 26 of the motorcycle is further coupled to a controller comprising electrical circuitry within the housing 22. The motion sensor 24 signals the controller to activate the pump when the motorcycle slows to a preset speed. The pump moves hydraulic fluid through the valve mechanism against each one of the hydraulic pistons within each one of the members 12, 14 so as to act upon each one of the slidable members 16, 18 extending the slidable members 16, 18. When the motorcycle is stationary, each one of the slidable members 16, 18 is fully extended so that each one of the pair of wheels 28, 30 meets a portion of a road surface providing upright stability for the motorcycle. When the motorcycle moves above a preset speed, the motion sensor 24 signals the controller within the electronic housing 22 stopping the pump and hydraulic fluid drains back through the valve mechanism releasing each one of the hydraulic pistons so that each one of the slidable members 16, 18 is retracted (see FIGS. 2 and 4). When the motorcycle is stationary and an ignition switch for the motorcycle is switched off, the controller within the housing 22 closes the valve mechanism within the hydraulic pump assembly 20 so that hydraulic pressure is maintained in the members 12, 14 and the slidable members 16, 18 remain fully extended. When the ignition switch is turned on, the controller within the housing 22 opens the valve mechanism and turns on the pump within the hydraulic pump assembly 20 so that the slidable members 16, 18 remain fully extended until the motion sensor 24 detects that the preset speed is exceeded causing the controller to turn off the pump in the hydraulic pump assembly 20 fully retracting the slidable members 16, 18 as described above.

Figure 2:
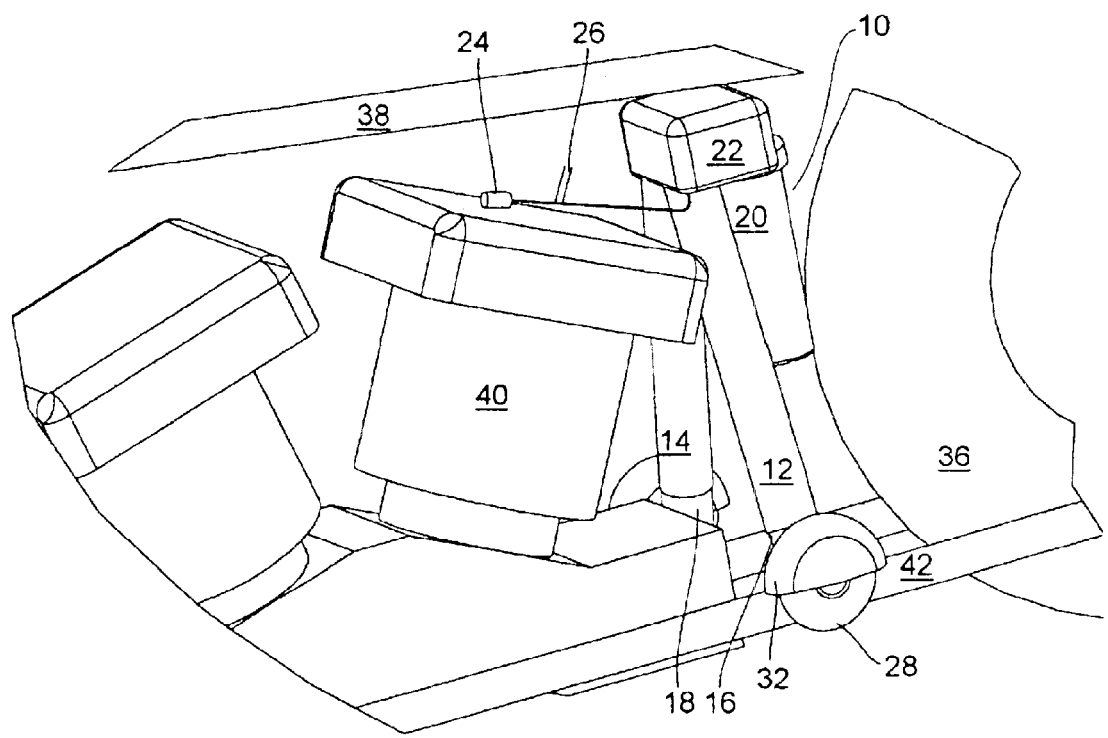
FIG. 2 is a perspective view of the portion of the motorcycle with the automatic balancing stand of FIG. 1 in a retracted position mounted to the frame near the rear wheel.

FIG. 2 is a partial perspective view of the motorcycle with the automatic balancing stand 10 of FIG. 1 near the rear wheel 36 and with the automatic balancing stand 10 in a retracted position. The wheels 28, 30 straddle outside of the two lower frame members 42, 44 of the motorcycle. All other features of the automatic balancing stand 10 in FIG. 2 are the same as described above.

Figure 3:
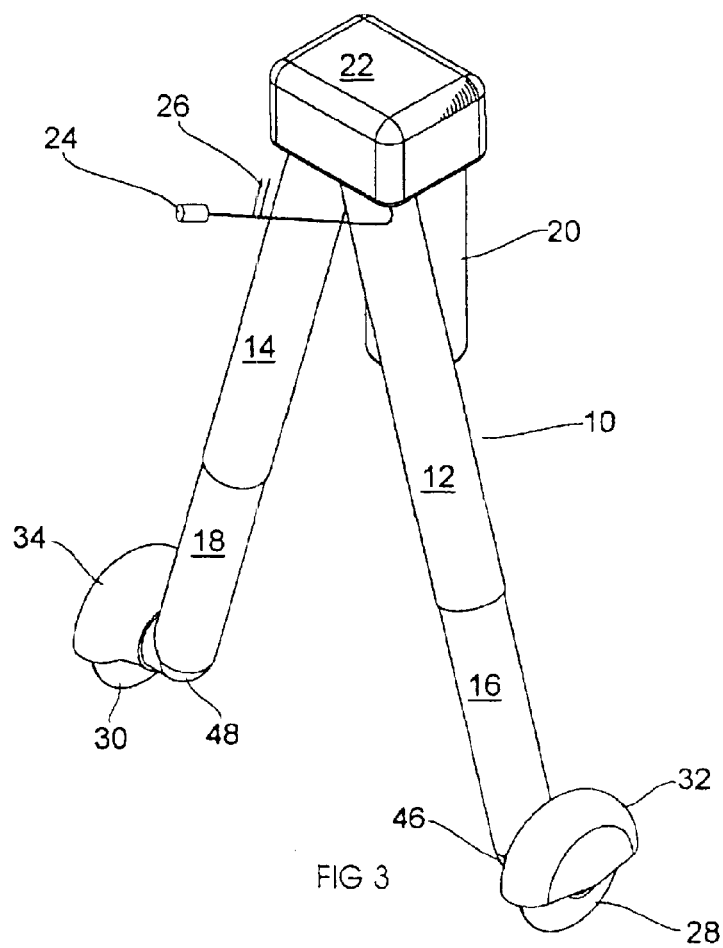
FIG. 3 is a perspective view of the automatic balancing stand in the extended position without the portion of the view of the motorcycle of FIG. 1.
Figure 4:
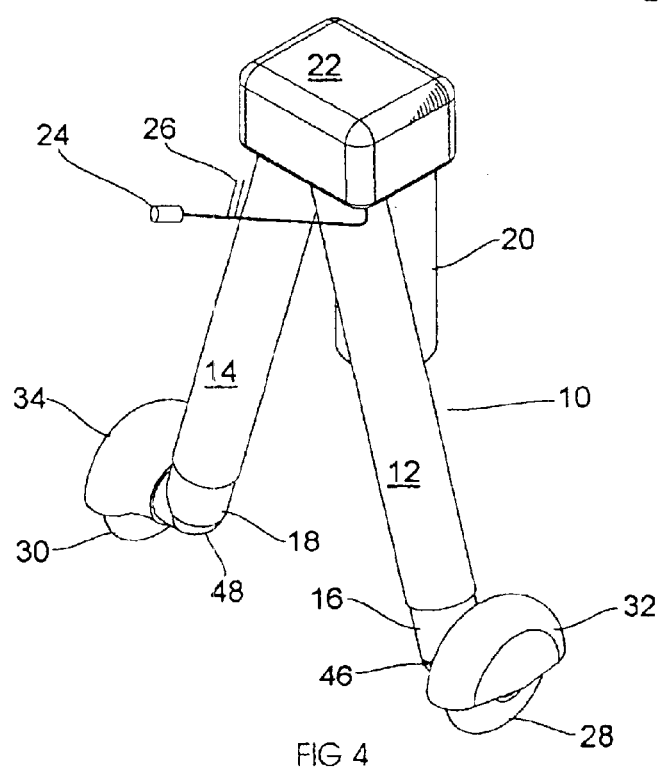
FIG. 4 is a perspective view of the automatic balancing stand in the retracted position without the portion of the view of the motorcycle of FIG. 2.

FIGS. 3 and 4 are perspective views of the automatic balancing stand 10 of FIGS. 1 and 2 in respectively the extended and in the retracted position without the portion of the view of the motorcycle. FIGS. 3 and 4 more clearly show the features of the automatic balancing stand 10 described above.

In summary, the present invention is directed to an automatic balancing stand for a motorcycle. The stand comprises a motion sensor coupled to a controller housed in an housing that signals a pump when the motorcycle changes speed. The housing is coupled to a hydraulic pump assembly comprising at least a pump, valve mechanism and hydraulic fluid. The stand further comprises a pair of members which are each coupled to a slidable member coupled to a wheel. Another end of the pair of members is coupled to the hydraulic pump assembly. The motion sensor signals the controller to activate the pump when the motorcycle slows to a preset speed causing the pump to activate hydraulic pistons within each one of the members extending the slidable members fully when the motorcycle is stationary. The slidable members are retracted when the motorcycle moves above the preset speed.

While the invention has been particularly shown and described with reference to preferred embodiments thereof, it will be understood by those skilled in the art that the foregoing and other changes in form and details may be made therein without departing from the spirit and scope of the invention. For example, the automatic balancing stand may be coupled to the top frame and the piston in various ways, including brackets or clamps for welding or bolting. The automatic balancing stand may be coupled to other portions of a motorcycle. The automatic balancing stand may be coupled to scooters and bicycles. The motion sensor may be connected to a wheel or to the speed indicator gauge. The motion sensor may be a photocell, a RF sensor, a gyroscope or use a Doppler shift mechanism. The wheel covers may comprise metals or plastics.

What is claimed is:

1. An automatic balancing stand for a motorcycle comprising, in combination:
   a motion sensor for detecting speed changes of the motorcycle;
   a controller coupled to said motion detector;
   a hydraulic pump assembly, said hydraulic pump assembly coupled to said controller;
   a pair of members, an end of each one of said members coupled to said hydraulic pump assembly; and
   a pair of slidable members, an end of each one of said slidable members coupled to another end of each one of said members, so that when said motion detector sensing the motorcycle reaches a preset speed, said motion detector signaling said controller, activating said hydraulic pump assembly, fully extending each one of said slidable members when the motorcycle is stationary, and deactivating said hydraulic pump assembly when the preset speed is exceeded, fully retracting said slidable members;
   said hydraulic pump assembly further comprising at least a hydraulic pump, a valve mechanism and hydraulic fluid for driving a pair of one-sided hydraulic pistons;
   an ignition switch of the motorcycle coupled to said controller, said controller closing said valve mechanism when said ignition switch is turned off, said slidable members remaining fully extended; and
   said controller opening said valve mechanism when said ignition switch 11 turned on, retracting said slidable members when the motorcycle exceed a preset speed.

2. The automatic balancing stand for a motorcycle according to claim 1 further comprising a pair of wheels of said automatic balancing stand and a pair of joint couplers, an end of each one of said joint couplers coupled to another end of each of said slidable members, and each one of said pair of wheels coupled to another end of each one of said joint couplers.

3. The automatic balancing stand for a motorcycle according to claim 1 further comprising a hydraulic pump and a housing, said controller and a portion of said hydraulic pump enclosed in said housing for driving a hydraulic pump, said housing coupled to said hydraulic pump assembly.

4. The automatic balancing stand for a motorcycle according to claim 1 wherein said each one of said members is a hydraulic cylinder, each one of said members including a one-sided hydraulic piston that drives each one of said slidable members from a retracted position to an extended position.

5. The automatic balancing stand for a motorcycle according to claim 1 wherein said automatic balancing stand is coupled to at least a portion of a surface of the motorcycle.

6. The automatic balancing stand for a motorcycle according to claim 1 wherein said pair of members coupled to said hydraulic pump assembly are substantially V-shaped so that the automatic balancing stand straddles a lower portion of the motorcycle.

7. A method for automatically balancing a motorcycle in an upright position comprising the steps of:
   providing a motion sensor for detecting speed changes of the motorcycle;
   providing a controller coupled to said motion detector;
   providing a hydraulic pump assembly, said hydraulic pump assembly coupled to said controller;
   providing a pair of members, an end of each one of said members coupled to said hydraulic pump assembly;
   providing a pair of slidable members, an end of each one of said slidable members coupled to another end of each one of said members;
   sensing the motorcycle speed using said motion sensor;
   signaling said controller using said motion sensor;
   activating said hydraulic pump assembly using said controller when the motorcycle reaches a preset speed;
   fully extending each one of said slidable members when the motorcycle is stationary;
   and fully retracting said slidable members by deactivating said hydraulic pump assembly when the preset speed is exceeded;

providing said hydraulic pump assembly comprising at least a hydraulic pump, a valve mechanism and hydraulic fluid for driving a pair of one-sided hydraulic pistons;

providing a hydraulic pump and a housing, said controller and a portion of said hydraulic pump enclosed in said housing for driving said hydraulic pump, said housing coupled to said hydraulic pump assembly;

providing an ignition switch of the motorcycle coupled to said controller;

said controller said valve mechanism when said ignition switch is turned off, said slidable members remaining fully extended; and said controller opening said valve mechanism when said ignition switch is turned on, retracting said slidable members when the motorcycle exceeds a present speed.

8. The method for automatically balancing a motorcycle in an upright position according to claim 7 further comprising the steps of:

providing a pair of joint couplers, an end of each one of said joint couplers coupled to another end of each of said slidable members; and providing a pair of wheels, each one of said pair of wheels coupled to another end of each one of said joint couplers.

9. The method for automatically balancing a motorcycle in an upright position according to claim 7 further comprising the steps of:

providing each one of said members is a hydraulic cylinder; and providing each one of said members including a one-sided hydraulic piston that drives each one of said slidable members from a retracted position to an extended position.

\* \* \* \* \*